US012661632B2

(12) United States Patent
Usui et al.

(10) Patent No.: US 12,661,632 B2
(45) Date of Patent: Jun. 23, 2026

(54) HYDROCARBON ADSORBENT AND METHOD FOR ADSORBING HYDROCARBONS

(71) Applicant: TOSOH CORPORATION, Yamaguchi (JP)

(72) Inventors: Toyohiro Usui, Yamaguchi (JP); Keita Nakao, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 543 days.

(21) Appl. No.: 17/915,332

(22) PCT Filed: Mar. 30, 2021

(86) PCT No.: PCT/JP2021/013664
§ 371 (c)(1),
(2) Date: Sep. 28, 2022

(87) PCT Pub. No.: WO2021/201018
PCT Pub. Date: Oct. 7, 2021

(65) Prior Publication Data
US 2023/0148413 A1 May 11, 2023

(30) Foreign Application Priority Data
Mar. 31, 2020 (JP) ................................. 2020-064909

(51) Int. Cl.
*B01J 20/18* (2006.01)
*B01D 53/02* (2006.01)
(Continued)

(52) U.S. Cl.
CPC .............. *B01J 20/18* (2013.01); *B01D 53/02* (2013.01); *C01B 39/20* (2013.01); *C01B 39/26* (2013.01);
(Continued)

(58) Field of Classification Search
CPC ...... B01J 20/18; B01J 20/186; B01J 20/2803; B01J 20/28057; B01J 20/3007;
(Continued)

(56) References Cited

U.S. PATENT DOCUMENTS

| | | | | | |
|---|---|---|---|---|---|
| 3,945,943 | A | * | 3/1976 | Ward | ...................... C10G 45/64 502/64 |
| 5,473,887 | A | * | 12/1995 | Takeshima | ............ F01N 13/009 60/276 |

(Continued)

FOREIGN PATENT DOCUMENTS

| | | |
|---|---|---|
| JP | H04-244230 A | 9/1992 |
| JP | 11-005020 A | 1/1999 |

(Continued)

OTHER PUBLICATIONS

International Search Report and Written Opinion of the International Searching Authority issued in Patent Application No. PCT/JP2021/013664, dated Jun. 22, 2021, along with an English translation thereof.

(Continued)

*Primary Examiner* — Dung H Bui
(74) *Attorney, Agent, or Firm* — GREENBLUM & BERNSTEIN, P.L.C.

(57) ABSTRACT

A hydrocarbon adsorbent having a high hydrocarbon desorption start temperature and a method for adsorbing hydrocarbons that uses the hydrocarbon adsorbent are provided. The hydrocarbon adsorbent includes an alkali metal and a zeolite having a ring structure that includes at least 10 members is used. In the hydrocarbon adsorbent, a content of the alkali metal is 1 to 40 mass % based on a total mass of the hydrocarbon adsorbent, a content of the zeolite having a ring structure that includes at least 10 members is 99 to 60 mass % based on the total mass of the hydrocarbon adsor- (Continued)

bent, and at least a portion of the alkali metal is in a state of being ion-exchangeable.

6 Claims, 1 Drawing Sheet

(51) Int. Cl.
| | | |
|---|---|---|
| *C01B 39/20* | (2006.01) | |
| *C01B 39/26* | (2006.01) | |
| *C01B 39/46* | (2006.01) | |

(52) U.S. Cl.
CPC ...... *C01B 39/46* (2013.01); *B01D 2253/1085* (2013.01); *B01D 2253/1122* (2013.01); *B01D 2257/702* (2013.01)

(58) Field of Classification Search
CPC B01J 20/3021; B01J 20/3042; B01J 20/3085; B01D 53/02; B01D 2253/1085; B01D 2253/1122; B01D 2257/702; B01D 2255/202; B01D 2255/2022; B01D 2255/2025; B01D 2255/2027; B01D 53/9486; C01B 39/20; C01B 39/26; C01B 39/46; C01B 39/026; C01B 39/48; Y02T 10/12
See application file for complete search history.

(56) References Cited

U.S. PATENT DOCUMENTS

| | | | | |
|---|---|---|---|---|
| 6,387,160 | B1 * | 5/2002 | Dangieri | B01D 53/02 |
| | | | | 95/117 |
| 6,508,863 | B1 * | 1/2003 | Byrne | B01D 53/52 |
| | | | | 95/902 |
| 6,617,276 | B1 | 9/2003 | Ballinger et al. | |
| 6,667,018 | B2 * | 12/2003 | Noda | B01J 37/0248 |
| | | | | 423/213.2 |
| 7,931,736 | B2 * | 4/2011 | Hidano | B01J 20/186 |
| | | | | 95/902 |
| 9,012,712 | B1 * | 4/2015 | Mooney | B01J 20/041 |
| | | | | 208/287 |
| 11,148,091 | B2 * | 10/2021 | Brody | B01J 20/3458 |
| 11,707,729 | B2 * | 7/2023 | Brody | B33Y 80/00 |
| | | | | 95/121 |
| 2001/0002988 | A1 | 6/2001 | Noda et al. | |
| 2003/0129098 | A1 | 7/2003 | Endo et al. | |
| 2005/0013774 | A1 * | 1/2005 | Dakka | B01J 29/7026 |
| | | | | 423/709 |
| 2006/0107649 | A1 * | 5/2006 | Kamikawa | F02D 41/029 |
| | | | | 422/177 |
| 2007/0191663 | A1 * | 8/2007 | Johnson | B01J 29/7026 |
| | | | | 585/475 |
| 2010/0304965 | A1 * | 12/2010 | Boek | C04B 35/478 |
| | | | | 502/344 |
| 2012/0070346 | A1 * | 3/2012 | Mizutani | B01D 46/2482 |
| | | | | 422/178 |
| 2012/0190896 | A1 * | 7/2012 | Mertens | B01J 35/77 |
| | | | | 585/407 |
| 2012/0260628 | A1 * | 10/2012 | Elangovan | B01D 53/9486 |
| | | | | 60/274 |
| 2012/0264987 | A1 * | 10/2012 | Mertens | C10G 35/065 |
| | | | | 585/653 |
| 2014/0194661 | A1 * | 7/2014 | Nicholas | B01J 2235/15 |
| | | | | 585/457 |
| 2015/0033715 | A1 * | 2/2015 | Markatou | B01J 23/42 |
| | | | | 502/262 |
| 2015/0087497 | A1 * | 3/2015 | Chiffey | B01J 23/42 |
| | | | | 502/1 |
| 2015/0176455 | A1 * | 6/2015 | Chandler | B01J 37/0248 |
| | | | | 60/300 |
| 2017/0074846 | A1 * | 3/2017 | Bell | F02D 41/222 |
| 2017/0282124 | A1 * | 10/2017 | Bischof | B01J 35/57 |
| 2017/0342886 | A1 * | 11/2017 | Gavin | F01N 3/2066 |
| 2020/0063056 | A1 * | 2/2020 | Tsybulevski | B01J 20/18 |
| 2020/0324268 | A1 * | 10/2020 | Kang | B01D 53/02 |
| 2020/0385270 | A1 * | 12/2020 | Delplanche | C02F 1/281 |
| 2021/0323832 | A1 * | 10/2021 | Li | B01J 37/036 |
| 2022/0282650 | A1 * | 9/2022 | Bergeal | F02D 41/401 |
| 2023/0049498 | A1 * | 2/2023 | Suwa | F01N 3/0835 |

FOREIGN PATENT DOCUMENTS

| | | | |
|---|---|---|---|
| JP | 2001-293368 A | 10/2001 | |
| JP | 2003-126689 A | 5/2003 | |
| JP | 2003-170057 A | 6/2003 | |
| WO | WO-2019132611 A1 * | 7/2019 | ........ B01D 53/9486 |

OTHER PUBLICATIONS

International Preliminary Report on Patentability issued in Patent Application No. PCT/JP2021/013664, dated Sep. 29, 2022.
Supplementary European Search Report dated Aug. 29, 2024 in European family member application No. 21780371.7.
Ramiro et al., "Experimental and theoretical studies about the adsorption of toluene on ZSM5 and mordenite zeolites modified with Cs", Microporous and Mesoporous Materials, 147 (2012), 17-29.
Kustov et al., Alkaline-modified ZSM-5 zeolite to control hydrocarbon cold-start emission, Microporous and Mesoporous Materials, 260 (2018), 54-58.

* cited by examiner

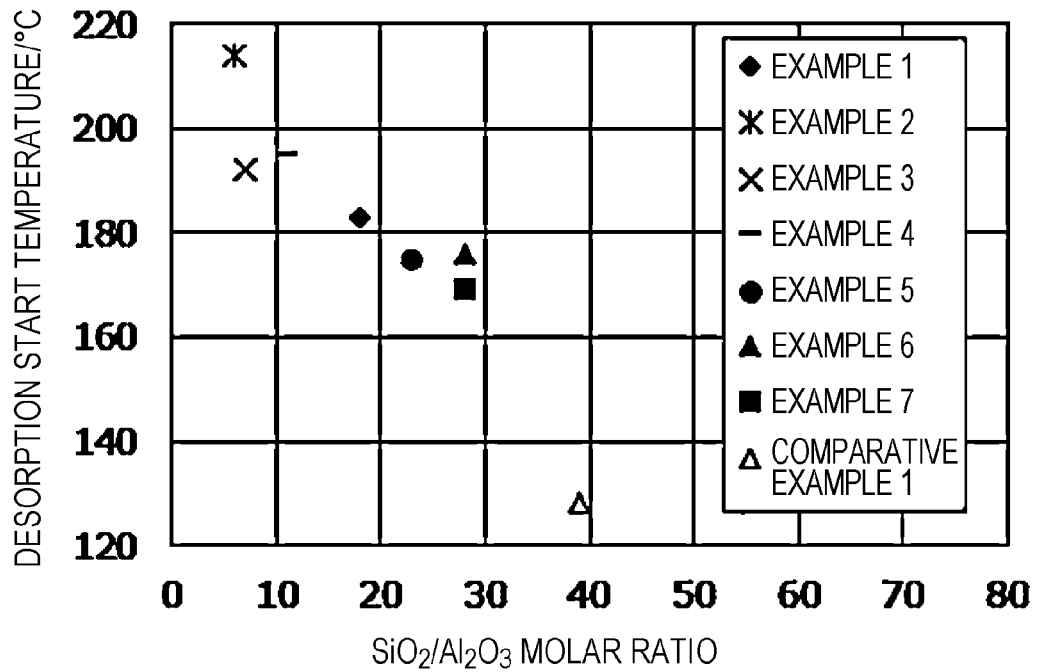

HYDROCARBON ADSORBENT AND METHOD FOR ADSORBING HYDROCARBONS

TECHNICAL FIELD

The present disclosure relates to a hydrocarbon adsorbent and a method for adsorbing hydrocarbons.

BACKGROUND ART

Exhaust gases emitted from internal combustion engines used in vehicles, such as automobiles and watercrafts, contain large quantities of hydrocarbons. The hydrocarbons emitted from internal combustion engines are purified with a three-way catalyst. A temperature environment necessary for the three-way catalyst to function is 200° C. or higher. Accordingly, when a temperature is in a range in which the three-way catalyst does not function, for example, during the so-called cold start period, hydrocarbons are adsorbed onto a hydrocarbon adsorbent, and the hydrocarbons are released from the adsorbent when the temperature reaches the range in which the three-way catalyst begins to function. The hydrocarbons are then decomposed and purified by the three-way catalyst. Hydrocarbon adsorbents typically use a zeolite-containing composition, and there is a need for the composition to have a high hydrocarbon desorption start temperature. This is because higher hydrocarbon desorption start temperatures enable hydrocarbons to be released in a state in which the three-way catalyst has higher activity, which is advantageous for the purification of hydrocarbons.

Patent Literature 1 proposes a zeolite-containing composition that serves as a composition having a high hydrocarbon desorption start temperature; the zeolite contains at least one kind of ion of an element having an electronegativity of 1.40 or more.

Patent Literature 2 proposes a hydrocarbon adsorbent formed of an alkali-metal-containing zeolite.

CITATION LIST

Patent Literature

PTL 1: Japanese Unexamined Patent Application Publication No. 11-005020

PTL 2: Japanese Unexamined Patent Application Publication No. 2001-293368

SUMMARY OF INVENTION

Technical Problem

In Patent Literature 1, a composition having a high desorption start temperature is provided; however, a noble metal needs to be used as a catalyst material, and considering that hydrocarbon adsorbents located upstream of a three-way catalyst are exposed to a higher temperature, heat resistance necessary for a hydrocarbon adsorbent to be practically used to purify hydrocarbons emitted from internal combustion engines is not achieved; in addition, there is a disadvantage in terms of cost. The hydrocarbon adsorbent of Patent Literature 2 presents a problem in that the hydrocarbon adsorbent does not have a sufficiently high hydrocarbon desorption start temperature. An object of the present disclosure is to provide a hydrocarbon adsorbent having a high hydrocarbon desorption start temperature or to provide a method for adsorbing hydrocarbons that uses the hydrocarbon adsorbent.

Solution to Problem

The present inventors studied adsorption properties of zeolite-containing compositions. As a result, it was discovered that specific hydrocarbon adsorbents have a high hydrocarbon desorption start temperature.

Specifically, the present invention is as described in the claims, and a summary of the present disclosure is as follows.

[1] A hydrocarbon adsorbent comprising an alkali metal and a zeolite having a ring structure that includes at least 10 members, characterized in that a content of the alkali metal is 1 to 40 mass % based on a total mass of the hydrocarbon adsorbent, a content of the zeolite having a ring structure that includes at least 10 members is 99 to 60 mass % based on the total mass of the hydrocarbon adsorbent, and at least a portion of the alkali metal is in a state of being ion-exchangeable.

[2] The hydrocarbon adsorbent according to [1], wherein a content of the alkali metal that is in a state of being ion-exchangeable is 1 mass % or more and 40 mass % or less based on the total mass of the hydrocarbon adsorbent.

[3] The hydrocarbon adsorbent according to [1] or [2], wherein the content of the alkali metal that is in a state of being ion-exchangeable is 4 mass % or more and 40 mass % or less based on the total mass of the hydrocarbon adsorbent.

[4] The hydrocarbon adsorbent according to any one of [1] to [3], wherein the alkali metal is at least one selected from the group consisting of sodium, potassium, rubidium and cesium.

[5] The hydrocarbon adsorbent according to [4], wherein the alkali metal is rubidium and/or cesium.

[6] The hydrocarbon adsorbent according to any one of [1] to [5], wherein the zeolite having a ring structure that includes at least 10 members has a molar ratio of silica to alumina ($SiO_2/Al_2O_3$ ratio) of 5 or more and 35 or less.

[7] The hydrocarbon adsorbent according to [6], wherein the zeolite having a ring structure that includes at least 10 members has a molar ratio of silica to alumina ($SiO_2/Al_2O_3$ ratio) of 5 or more and 20 or less.

[8] The hydrocarbon adsorbent according to any one of [1] to [7], wherein the zeolite having a ring structure that includes at least 10 members is a zeolite having at least one structure selected from a group of a BEA structure, an MFI structure, an MOR structure and an FAU structure.

[9] A method for adsorbing a hydrocarbon, the method comprising using the hydrocarbon adsorbent according to any one of [1] to [8].

Advantageous Effects of Invention

With the present disclosure, at least one of the following objects is achieved: to provide a hydrocarbon adsorbent having a high hydrocarbon desorption start temperature and to provide a method for adsorbing hydrocarbons that uses the hydrocarbon adsorbent.

BRIEF DESCRIPTION OF DRAWINGS

FIG. 1 A graph illustrates a relationship between a hydrocarbon desorption start temperature and a $SiO_2/Al_2O_3$ ratio, regarding Examples and a Comparative Example.

DESCRIPTION OF EMBODIMENTS

A hydrocarbon adsorbent of the present disclosure will be described below with reference to an exemplary embodiment. Note that in the present disclosure, when "to" is used to indicate a range, the number preceding "to" and the number following "to" are included in the range. For example, "1 to 40%" is synonymous with "1% or more and 40% or less". Furthermore, in the present disclosure, "A and/or B" is synonymous with "at least one of A and B". For example, "rubidium and/or cesium" is synonymous with "at least one of rubidium and cesium".

The hydrocarbon adsorbent of the present disclosure is one in which a content of an alkali metal is 1 to 40 mass % based on the total mass of the hydrocarbon adsorbent (taken as 100 mass %), and a content of a zeolite having a ring structure that includes at least 10 members (hereinafter also referred to as a "large-pore zeolite") is 99 to 60 mass % based on the total mass of the hydrocarbon adsorbent (hereinafter, the content of an alkali metal based on the total mass of the hydrocarbon adsorbent is also referred to as an "alkali metal content", and the content of a large-pore zeolite based on the total mass of the hydrocarbon adsorbent is also referred to as a "zeolite content"). That is, the hydrocarbon adsorbent of the present disclosure is one in which an alkali metal is present in an amount of 1 to 40 mass % based on the total mass of the hydrocarbon adsorbent, and a large-pore zeolite is present in an amount of 99 to 60 mass % based on the total mass of the hydrocarbon adsorbent. The hydrocarbon adsorbent is preferably one in which an alkali metal is present in an amount of 5 to 40 mass % based on the total mass of the hydrocarbon adsorbent, and a large-pore zeolite is present in an amount of 95 to 60 mass % based on the total mass of the hydrocarbon adsorbent (the alkali metal content is 5 to 40 mass %, and the zeolite content is 95 to 60 mass %) and is more preferably one in which an alkali metal is present in an amount of 10 to 40 mass % based on the total mass of the hydrocarbon adsorbent, and a large-pore zeolite is present in an amount of 90 to 60 mass % based on the total mass of the hydrocarbon adsorbent (the alkali metal content is 10 to 40 mass %, and the zeolite content is 90 to 60 mass %). Furthermore, the hydrocarbon adsorbent of the present disclosure is one in which at least a portion of the alkali metal is in a state of being ion-exchangeable.

Note that the alkali metal mentioned above is an alkali metal element, and the state of the element is not particularly limited; preferably, the alkali metal is in an ionic state.

Because of the configuration requirements, the hydrocarbon adsorbent of the present disclosure has heat resistance sufficient for use and has a high hydrocarbon desorption start temperature.

Preferably, the zeolite (large-pore zeolite) that is included in the hydrocarbon adsorbent of the present disclosure is a crystalline aluminosilicate. The crystalline aluminosilicate is a zeolite having a crystal structure formed of repeating networks containing aluminum (Al) and silicon (Si) with interposed oxygen (O).

In the present disclosure, the zeolite is a compound having a regular structure in which framework atoms (hereinafter also referred to as "T atoms") are disposed with interposed oxygen (O), and the T atoms are at least one of the following: metal atoms, metalloid atoms and atoms other than the foregoing atoms. Examples of the metal atoms include atoms of at least one selected from a group of iron (Fe), aluminum (Al), gallium (Ga), tin (Sn) and titanium (Ti), boron (B) atoms and atoms of a different transition metal element. Examples of the metalloid atoms include atoms of at least one selected from a group of boron (B), silicon (Si), germanium (Ge), arsenic (As), antimony (Sb) and tellurium (Te). Examples of the atoms other than the foregoing atoms include phosphorus (P) atoms. The zeolite of the present disclosure encompasses not only aluminosilicates but also metallosilicates, such as ferrosilicates and gallosilicates, and zeolite analogues, such as silicoaluminophosphates (SAPO) and aluminophosphates (AlPO).

The "framework structure" (which is used herein interchangeably with "crystal structure" and may hereinafter also be referred to as a "zeolite structure") of the zeolite is a framework structure determined according to the structure code specified by the Structure Commission of the International Zeolite Association (hereinafter also referred to simply as a "structure code"). The framework structure can be identified by comparing an XRD pattern of a zeolite of interest against XRD patterns of zeolite structures shown in Collection of Simulated XRD Powder Patterns for Zeolites, Fifth Revised Edition (2007) (hereinafter also referred to as "reference patterns").

In the present disclosure, the XRD pattern may be an XRD pattern obtained from an XRD measurement performed under the following conditions.

Acceleration current and voltage: 40 mA and 40 kV
Radiation source: CuKα radiation ($\lambda$=1.5405 Å)
Measurement mode: continuous scanning
Scanning condition: 40°/minute
Measurement range: 2θ=3° to 43°
Vertical divergence limiting slit: 10 mm
Divergence/entrance slit: 1°
Receiving slit: open
Receiving solar slit: 5°
Detector: semiconductor detector (D/teX Ultra)
Ni filter used In the present disclosure, the "ring structure" is a ring-shaped framework structure formed of T atoms and oxygen atoms, and the "ring structure that includes at least 10 members" is a framework structure formed of at least 10 T atoms and oxygen atoms. Examples of the ring structure include ring structures including 10 members, 12 members, 14 members or 18 members.

In the present disclosure, examples of the large-pore zeolite include zeolites having a BEA structure, an MFI structure, an FAU structure, an FER structure, an MOR structure or the like. From the standpoint of achieving a high hydrocarbon desorption start temperature, it is preferable that the large-pore zeolite be a zeolite having a BEA structure, an MFI structure, an FAU structure or an MOR structure. More preferably, the large-pore zeolite is a zeolite having a BEA structure or an MFI structure, and even more preferably, a zeolite having an MFI structure. In the present disclosure, a zeolite having a specific zeolite structure is also referred to as a " . . . -type zeolite". For example, a zeolite having a BEA structure, preferably a zeolite having only a BEA structure, is also referred to as a "BEA-type zeolite".

The hydrocarbon adsorbent of the present disclosure includes an alkali metal. The alkali metal (the type of the alkali metal) of the present disclosure is not particularly limited and may be, for example, at least one selected from a group of sodium, potassium, rubidium and cesium. Preferably, the alkali metal is rubidium and/or cesium, and more preferably, cesium. Note that the alkali metal may be in the form of two or more coexisting alkali metals.

The alkali metal that is included in the hydrocarbon adsorbent of the present disclosure is not particularly limited and may be an alkali metal included in the large-pore zeolite that is included in the hydrocarbon adsorbent. Examples of the alkali metal include an alkali metal already present in a zeolite derived from a hydrothermal synthesis, which is described later, (resulting from a crystallization step) (i.e., an alkali metal incorporated into the zeolite as a result of crystallization) and an alkali metal incorporated into the zeolite by a post-treatment (e.g., an alkali metal incorporated into the zeolite by performing an impregnation treatment on the zeolite with the alkali metal or an alkali metal incorporated into the zeolite by first performing ion exchange thereon with hydrogen ions or ammonium ions and thereafter performing an impregnation treatment thereon with the alkali metal.

The hydrocarbon adsorbent of the present disclosure includes at least an alkali metal that is supported on the zeolite as a result of a post treatment and is in a state in which the alkali metal is not removed by ion exchange. The inclusion of such an alkali metal is believed to be one of the reasons that the hydrocarbon adsorbent of the present disclosure is likely to exhibit a higher desorption start temperature. In this instance, it is sufficient that the post-treatment and the ion exchange be known methods that are used to introduce an alkali metal into a zeolite.

In the hydrocarbon adsorbent of the present disclosure, the alkali metal is one in which at least a portion thereof is in a state of being ion-exchangeable. This enables the hydrocarbon adsorbent to exhibit a higher hydrocarbon desorption start temperature. In the present disclosure, "an alkali metal is in a state of being ion-exchangeable" means that a portion or the whole of the alkali metal present in the zeolite is in a state of being ion-exchangeable with a different alkali metal (i.e., a different type of alkali metal). The hydrocarbon adsorbent, which has an alkali metal having such a state, can be produced, for example, by using the production method described later.

Whether the alkali metal is in a state of being ion-exchangeable can be determined as follows. The hydrocarbon adsorbent of the present disclosure is subjected to ion exchange with an alkali metal of a type not included in the hydrocarbon adsorbent, to examine whether the alkali metal originally included in the hydrocarbon adsorbent is lost as a result of the ion exchange (whether the alkali metal is ion-exchanged). For example, in instances where 50% of a total amount of the originally included alkali metal is lost (exchanged) as a result of the ion exchange, it is indicated that 50% of the alkali metal, in the total amount of the alkali metal, is in a state of being ion-exchangeable. Furthermore, in instances where the total amount of the originally included alkali metal is lost (exchanged) as a result of the ion exchange, it is indicated that 100% of the alkali metal, in the total amount of the alkali metal, is ion-exchangeable.

In the total amount (taken as 100 mol %) of the alkali metal included in the hydrocarbon adsorbent of the present disclosure, a proportion of the alkali metal that is ion-exchangeable with a different type of alkali metal, that is, a proportion of the alkali metal that is in a state of being ion-exchangeable in the hydrocarbon adsorbent of the present disclosure, may be within a range of 30 to 100 mol %. This is preferable from the standpoint of achieving a high hydrocarbon desorption start temperature. More preferably, the proportion may be within a range of 50 to 95 mol %. That is, in the hydrocarbon adsorbent of the present disclosure, it is preferable that 30 to 100 mol % of the total amount of the alkali metal be in a state of being ion-exchangeable, and it is more preferable that 50 to 95 mol % of the total amount of the alkali metal be in a state of being ion-exchangeable.

The alkali metal that is included in the hydrocarbon adsorbent of the present disclosure may be, for example, at least one selected from a group of sodium, potassium, rubidium and cesium. Preferably, the alkali metal is rubidium and/or cesium.

In this instance, it is preferable that the rubidium and/or cesium included in the hydrocarbon adsorbent of the present disclosure be ion-exchangeable with sodium and/or potassium. In the total amount (100 mol %) of the rubidium and/or cesium, it is preferable that 30 to 100 mol % thereof be in a state of being ion-exchangeable, and it is more preferable that 50 to 95 mol % thereof be in a state of being ion-exchangeable.

In another embodiment, it is preferable that the alkali metal that is included in the hydrocarbon adsorbent of the present disclosure be sodium and/or potassium.

In this instance, it is preferable that the sodium and/or potassium included in the hydrocarbon adsorbent of the present disclosure be ion-exchangeable with rubidium and/or cesium. In the total amount (100 mol %) of the sodium and/or potassium, it is preferable that 30 to 100 mol % thereof be in a state of being ion-exchangeable, and it is more preferable that 50 to 95 mol % thereof be in a state of being ion-exchangeable.

In the present disclosure, the amount of the alkali metal can be measured by inductively coupled plasma emission spectroscopy (ICP-AES), and the amount of the alkali metal that is in a state of being ion-exchangeable can be quantitatively determined with the method described in the Examples section.

Furthermore, the amount of the alkali metal that is in a state of being ion-exchangeable in the hydrocarbon adsorbent formed of the alkali-metal-containing large-pore zeolite can be quantitatively determined with the following method. Specifically, an aqueous solution is passed through the hydrocarbon adsorbent formed of a large-pore zeolite containing an alkali metal (e.g., cesium (Cs)). The aqueous solution contains a different type of alkali metal (e.g., sodium (Na)), other than the first-mentioned alkali metal. The aqueous solution may be used in an amount such that a large excess of the alkali metal (Na) is present relative to the amount of the aluminum in the large-pore zeolite included in the hydrocarbon adsorbent (e.g., in an amount such that Na is present in an amount of 5 molar equivalents relative to the amount of the aluminum of the large-pore zeolite). After the passing of the solution, a sufficient amount (e.g., an amount that is 8 to 12 times the mass of the hydrocarbon adsorbent) of warm water (50 to 70° C.) is passed through the hydrocarbon adsorbent to wash the hydrocarbon adsorbent. After the washing, the hydrocarbon adsorbent is dried in air at 110° C. Accordingly, the originally included alkali metal (Cs) is replaced with a different type of alkali metal (Na).

By determining the molar ratios of the alkali metal (Cs) to the aluminum in the hydrocarbon adsorbent before the passing of the solution and after the drying, the proportion (molar proportion) of the alkali metal that is in a state of being ion-exchangeable can be determined, according to the following equation.

$$R=[\{Me/Al(before)-Me/Al(after)\}\div Me/Al(before)]\times 100$$

In the equation, R is a proportion (mol %) of the ion-exchangeable alkali metal, Me/Al (before) is a molar ratio of the alkali metal to the aluminum in the hydrocarbon adsorbent before the passing of the solution and Me/Al (after) is a molar ratio of the alkali metal to the aluminum in the hydrocarbon adsorbent after the drying, where the alkali metal (Me) in Me/Al (before) and the alkali metal (Me) in Me/Al (after) are both the same type of alkali metal as the alkali metal present in the hydrocarbon adsorbent before the passing of the solution.

A content of the ion-exchangeable alkali metal in the hydrocarbon adsorbent of the present disclosure is preferably 0.01 mass % or more and 40 mass % or less, more preferably 1 mass % or more and 40 mass % or less and even more preferably 4 mass % or more and 40 mass % or less, based on the total mass of the hydrocarbon adsorbent.

The content (mass %) of the alkali metal that is in a state of being ion-exchangeable can be determined by multiplying the alkali metal content (mass %) of the large-pore zeolite that is included in the hydrocarbon adsorbent of the present disclosure, by the proportion (%) of the alkali metal that is in a state of being ion-exchangeable in the alkali metal present therein.

The large-pore zeolite that is included in the hydrocarbon adsorbent of the present disclosure has a molar ratio of silica to alumina (hereinafter also referred to as a "$SiO_2/Al_2O_3$ ratio"), which is not particularly limited and may be specified to be 5 or more and 40 or less or 5 or more and 35 or less, from the standpoint of achieving a high hydrocarbon desorption start temperature. The molar ratio is more preferably 5 or more and 30 or less, even more preferably 5 or more and 20 or less, still more preferably 5 or more and 18 or less, still further more preferably 5 or more and 15 or less and particularly preferably 5 or more and 10 or less.

The large-pore zeolite may have a BET specific surface area of 200 m$^2$/g or more and 800 m$^2$/g or less, which is preferable from the standpoint of achieving a high hydrocarbon desorption start temperature. The BET specific surface area is more preferably 300 m$^2$/g or more and 700 m$^2$/g or less.

The hydrocarbon adsorbent of the present disclosure may include, if necessary, one or more components other than those described above. Examples of the components other than those described above include, but are not limited to, binders.

In the present disclosure, examples of preferred hydrocarbon adsorbents include a hydrocarbon adsorbent including an alkali metal and a zeolite, in which the alkali metal is one of sodium, potassium, rubidium or cesium; the zeolite is at least one selected from a group of BEA-type zeolites, FAU-type zeolites, MOR-type zeolites and MFI-type zeolites and having a $SiO_2/Al_2O_3$ ratio of 5 or more and 40 or less; a content of the alkali metal is 1 mass % or more and 30 mass % or less based on the total mass of the hydrocarbon adsorbent, and a content of the zeolite is 70 mass % or more and 99 mass % or less based on the total mass of the hydrocarbon adsorbent; and 20 mass % or more and 98 mass % or less of the alkali metal is in a state of being ion-exchangeable.

Examples of hydrocarbon adsorbents that exhibit a higher desorption start temperature include a hydrocarbon adsorbent including cesium and a zeolite, in which the zeolite is at least one selected from a group of BEA-type zeolites, FAU-type zeolites, MOR-type zeolites and MFI-type zeolites and has a $SiO_2/Al_2O_3$ ratio of 5 or more and 30 or less; a content of the cesium is 8 mass % or more and 30 mass % or less based on the total mass of the hydrocarbon adsorbent, and a content of the zeolite is 70 mass % or more and 92 mass % or less based on the total mass of the hydrocarbon adsorbent; and 40 mass % or more and 98 mass % or less of the alkali metal is in a state of being ion-exchangeable.

Examples of hydrocarbon adsorbents that exhibit an even higher desorption start temperature include a hydrocarbon adsorbent including cesium and a zeolite, in which the zeolite is at least one selected from a group of BEA-type zeolites, FAU-type zeolites, MOR-type zeolites and MFI-type zeolites and has a $SiO_2/Al_2O_3$ ratio of 5 or more and 20 or less; a content of the cesium is 10 mass % or more and 30 mass % or less based on the total mass of the hydrocarbon adsorbent, and a content of the zeolite is 70 mass % or more and 90 mass % or less based on the total mass of the hydrocarbon adsorbent; and 20 mass % or more and 96 mass % or less of the alkali metal is in a state of being ion-exchangeable.

Examples of hydrocarbon adsorbents that exhibit a particularly high desorption start temperature include a hydrocarbon adsorbent including cesium and a zeolite, in which the zeolite is at least one selected from a group of FAU-type zeolites, MOR-type zeolites and MFI-type zeolites and has a $SiO_2/Al_2O_3$ ratio of 5 or more and 17 or less; a content of the cesium is 10 mass % or more and 30 mass % or less based on the total mass of the hydrocarbon adsorbent, and a content of the zeolite is 70 mass % or more and 90 mass % or less based on the total mass of the hydrocarbon adsorbent; and 20 mass % or more and 95 mass % or less of the alkali metal is in a state of being ion-exchangeable.

Now, methods for producing the hydrocarbon adsorbent of the present disclosure will be described.

Methods for producing the hydrocarbon adsorbent of the present disclosure are not limited. Production methods that can be used to obtain the hydrocarbon adsorbent of the present disclosure are as follows: a production method including an alkali metal incorporation step in which an alkali metal is incorporated into a large-pore zeolite; and a production method including a crystallization step in which a composition containing a silica source, an alumina source, an alkali source and water (hereinafter also referred to as a "raw material composition") is subjected to a hydrothermal treatment to yield a crystallized product and including an alkali metal incorporation step in which an alkali metal is incorporated into the crystallized product. These production methods also correspond to methods for producing the large-pore zeolite that is included in the hydrocarbon adsorbent of the present disclosure. Note that in the crystallization step, a structure directing agent (hereinafter also referred to as an "SDA") may be additionally used, if necessary, that is, a raw material composition containing an SDA may be subjected to a hydrothermal treatment. From the standpoint of simplifying production operation, it is preferable not to use any SDA, whereas, from the standpoint of extending a production control limit, it is preferable to use an SDA.

The silica source is at least one of silica and a precursor thereof. For example, the silica source may be at least one from the group consisting of colloidal silica, amorphous silica, sodium silicate, tetraethyl orthosilicate and an aluminosilicate gel. In particular, the silica source is preferably at least one of colloidal silica and amorphous silica or is colloidal silica or amorphous silica.

The alumina source is at least one of alumina and a precursor thereof. For example, the alumina source may be at least one from the group consisting of aluminum nitrate, aluminum sulfate, sodium aluminate, aluminum hydroxide, aluminum chloride, an aluminosilicate gel and metal aluminum. In particular, the alumina source is preferably at least one of aluminum hydroxide and aluminum sulfate or is aluminum hydroxide or aluminum sulfate.

The alkali source may be, for example, at least one from the group consisting of various salts, such as hydroxides, halides and carbonate salts of lithium, sodium, potassium, rubidium, cesium, francium, magnesium, calcium, strontium or ammonium. In particular, the alkali source is preferably at least one hydroxide selected from a group of hydroxides of sodium, hydroxides of potassium and hydroxides of ammonium or is a hydroxide of sodium, potassium or ammonium.

The raw material composition may include an SDA if necessary. The structure directing agent may be, for example, at least one selected from the group consisting of tetraethylammonium hydroxide (hereinafter also referred to as "TEAOH"), tetraethylammonium bromide, tetrapropylammonium hydroxide, tetrapropylammonium bromide and a dimethyldipropylammonium salt (hereinafter also referred to as "Me$_2$Pr$_2$N$^+$"). Examples of the dimethyldipropylammonium salt include, but are not limited to, dimethyldipropylammonium hydroxide, dimethyldipropylammonium chloride and dimethyldipropylammonium bromide.

In the methods for producing the zeolite of the present disclosure, it is desirable that the raw material composition include a seed crystal of a zeolite (hereinafter also referred to simply as a "seed crystal"). The use of a seed crystal accelerates the crystallization of the zeolite, which shortens the time necessary for the production of the zeolite and, in addition, improves the yield.

It is desirable that the seed crystal be an aluminosilicate having an LTL structure, an LTA structure, an MOR structure, an MFI structure, a BEA structure, an FAU structure, a CHA structure or a YFI structure.

The SiO$_2$/Al$_2$O$_3$ molar ratio of the seed crystal is desirably 2 to 100 and more desirably 3 to 60.

It is desirable that an amount of addition of the seed crystal (i.e., a content of the seed crystal in the raw material composition) be small. On the other hand, in terms of a reaction rate, an impurity-inhibiting effect and the like, it is desirable that the content of the seed crystal be 0.1 to 60 mass % relative to a mass of the silica component included in the raw material composition. More desirably, the content of the seed crystal is 0.5 to 40 mass %.

The content of the seed crystal (hereinafter also referred to as the "seed crystal content") in the raw material composition can be determined according to the following equation, where the mass of the silicon (Si) included in the raw material composition is calculated as SiO$_2$.

Seed crystal content (mass %)=(mass of SiO$_2$ of seed crystal)/(mass of SiO$_2$ of raw material composition)×100

A preferred composition of the raw material composition is the following composition (molar composition), for example.

SiO$_2$/Al$_2$O$_3$ ratio=3 or more and 40 or less
SDA/SiO$_2$ ratio=0 or more and 0.50 or less
Me/SiO$_2$ ratio=0 or more and 0.50 or less
H$_2$O/SiO$_2$ ratio=3 or more and 100 or less
In the above equations, Me represents an alkali metal element.

The crystallization step can crystallize the raw material composition with a hydrothermal treatment. The conditions for the hydrothermal treatment are not particularly limited as long as the conditions are those under which a large-pore crystallized zeolite can be obtained. Examples of the conditions include the following conditions.

Crystallization temperature: 80° C. or higher and 200° C. or lower
Crystallization time: 1 hour to 10 days
Crystallization pressure: autogenous pressure
This crystallization step can produce a large-pore zeolite. After the crystallization step, the resulting large-pore zeolite may be subjected to the steps of collection, washing, drying and calcination that are performed with any method, and in addition, a dealumination treatment may be performed to achieve a desired SiO$_2$/Al$_2$O$_3$ ratio.

From the standpoint of increasing the hydrocarbon desorption start temperature, it is preferable that, after the crystallization step, the resulting large-pore zeolite be subjected to a calcination step.

The calcination step is a step for removing the SDA from the large-pore zeolite. The conditions for the calcination are not limited, and examples of the conditions for the calcination include an oxidizing atmosphere, a calcination temperature of 400° C. or higher and 800° C. or less and a calcination time of 0.5 hours or more and 12 hours or less.

The production methods of the present disclosure include an alkali metal incorporation step. The alkali metal incorporation step is a step for contacting an alkali metal with the large-pore zeolite, thereby incorporating the alkali metal into the zeolite. This enables the incorporation of the alkali metal while also enabling at least a portion of the alkali metal to be placed in a state of being ion-exchangeable. In the alkali metal incorporation step, the alkali metal is incorporated in a manner that intentionally creates a state in which the alkali metal is not coordinated at some of the ion exchange sites (alkali metal coordination sites) of the framework of the large-pore zeolite (zeolite structure). As a result, presumably, at least a portion of the alkali metal that is included in the resulting large-pore zeolite and the hydrocarbon adsorbent is placed in a state of being ion-exchangeable, which, consequently, increases the hydrocarbon desorption start temperature.

The alkali metal to be incorporated is not particularly limited and may be at least one selected from a group of sodium, potassium, rubidium and cesium. The alkali metal is preferably rubidium and/or cesium and more preferably cesium. Note that two or more alkali metals may be incorporated simultaneously, sequentially or intermittently.

In instances where sodium, potassium, rubidium or cesium is to be incorporated into the large-pore zeolite of the present disclosure, it is preferable to use a compound of sodium, potassium, rubidium or cesium, and it is more preferable to use an inorganic salt containing sodium, potassium, rubidium or cesium or use at least one from the group consisting of sulfate salts, nitrate salts, acetate salts, hydroxides and chlorides that contain sodium, potassium, rubidium or cesium.

It is sufficient that the alkali metal incorporation step be a method that incorporates an alkali metal into at least one of the ion exchange sites and the pores, of the large-pore zeolite. Specifically, the method may be at least one from the group consisting of ion exchange, evaporation to dryness and incipient wetness impregnation. Preferably, the method is incipient wetness impregnation, particularly, a method in which an aqueous solution containing an alkali metal compound is mixed with the zeolite.

Note that in the alkali metal incorporation step, the alkali metal is incorporated in a manner that intentionally creates a state in which the alkali metal is not coordinated at some of the ion exchange sites (alkali metal coordination sites) of the framework of the large-pore zeolite. That is, the alkali metal incorporation step is one that causes at least a portion of the alkali metal that is included in the hydrocarbon adsorbent to be placed in a state of being ion-exchangeable. Methods therefor are not particularly limited, and examples of the methods include the method described in the Examples section of the present disclosure (a method in which the zeolite is used as a fixed bed, and a solution of an alkali metal is passed through the fixed bed to cause the alkali metal to be supported thereon). A specific method for the alkali metal incorporation step may be a method in which a zeolite bed obtained by filtering a zeolite-containing slurry is used as a fixed bed, and an alkali metal solution is passed through the fixed bed from above sequentially or intermittently. A water content of the zeolite bed may be, for example, 35 mass % or more and 75 mass % or less, 40 mass % or more and 75 mass % or less, 40 mass % or more and 70 mass % or less or 50 mass % or more and 70 mass % or less. A density of the zeolite bed may be 0.25 g/cm³ or more and 0.9 g/cm³ or less or 0.3 g/cm³ or more and 0.7 g/cm³ or less.

Note that the production methods of the present disclosure may include at least one of a washing step, a drying step or an activation step, which is performed after the alkali metal incorporation step.

The washing step after the alkali metal incorporation step is a step for removing impurities and the like from the zeolite, and the washing may be performed with any washing method. For example, the large-pore zeolite may be washed with a sufficient amount of purified water.

The drying step after the alkali metal incorporation step is a step for removing water from the zeolite, and the process (drying) may be performed, for example, in air at a temperature of 100° C. or higher and 200° C. or lower or preferably a temperature of 110° C. or higher and 190° C. or lower. The process time is not limited and may be, for example, 1 hour or more and 2 hours or less.

The activation step after the alkali metal incorporation step is a step for removing organic matter from the zeolite, and the process (activation) may be performed, for example, in air at a temperature of higher than 200° C. and 600° C. or lower or preferably in air at a temperature of higher than 300° C. and 600° C. or lower. The process time is not limited and may be, for example, 1 hour or more and 2 hours or less.

The hydrocarbon adsorbent of the present disclosure is a hydrocarbon adsorbent including a large-pore zeolite obtained as described above and may be a hydrocarbon adsorbent formed of the large-pore zeolite containing an alkali metal.

The hydrocarbon adsorbent of the present disclosure may have any shape depending on the intended use. Preferably, the hydrocarbon adsorbent may be at least one of a powder and a molded body. A specific shape of the molded body may be at least one from the group consisting of spherical shapes, generally spherical shapes, elliptical shapes, disc shapes, cylindrical shapes, polyhedral shapes, irregular shapes and petaloid shapes.

In instances where the hydrocarbon adsorbent is employed as a powder, the hydrocarbon adsorbent may be mixed with a solvent, such as water or alcohol, to form a slurry, and the slurry may be coated onto a substrate to form an adsorbent member.

In instances where the hydrocarbon adsorbent of the present disclosure is used as a molded body, the hydrocarbon adsorbent may be mixed with a binder, if necessary, and may be molded with any method. Preferably, the binding agent may be, for example, at least one from the group consisting of silica, alumina, kaolin, attapulgite, montmorillonite, bentonite, allophane and sepiolite. A method for the molding may be, for example, at least one from the group consisting of tumbling granulation, press molding, extrusion molding, injection molding, slip casting and sheet molding.

The hydrocarbon adsorbent of the present disclosure is preferably a hydrocarbon adsorbent for adsorbing hydrocarbons at 160° C. or less and more preferably a hydrocarbon adsorbent for adsorbing hydrocarbons at 160° C. or less and desorbing the adsorbed hydrocarbons at higher than 160° C.

Further, more preferably, the hydrocarbon adsorbent is a hydrocarbon adsorbent for adsorbing hydrocarbons at 170° C. or lower and desorbing the adsorbed hydrocarbons at higher than 170° C. or is a hydrocarbon adsorbent for adsorbing hydrocarbons at 180° C. or lower and desorbing the adsorbed hydrocarbons at higher than 180° C. The hydrocarbon adsorbent of the present disclosure can be used in a method for adsorbing hydrocarbons.

The hydrocarbon adsorbent of the present disclosure can adsorb hydrocarbons with a method including a step of contacting a hydrocarbon-containing fluid with the hydrocarbon adsorbent of the present disclosure.

The hydrocarbon-containing fluid may be, for example, a hydrocarbon-containing gas or a hydrocarbon-containing liquid.

The hydrocarbon-containing gas is a gas containing at least one hydrocarbon and preferably a gas containing two or more hydrocarbons. The hydrocarbon present in the hydrocarbon-containing gas may be at least one from the group consisting of paraffins, olefins and aromatic hydrocarbons. It is sufficient that the number of carbon atoms of the hydrocarbon be 1 or more. Preferably, the number of carbon atoms is 1 or more and 15 or less. Preferably, the hydrocarbon present in the hydrocarbon-containing gas is at least two from the group consisting of methane, ethane, ethylene, propylene, butane, linear paraffins having 5 or more carbon atoms, linear olefins having 5 or more carbon atoms, benzene, toluene and xylene. The hydrocarbon is preferably at least two from the group consisting of methane, ethane, ethylene, propylene, butane, benzene, toluene and xylene and more preferably at least one from the group consisting of methane, ethane, ethylene and propylene and at least one from the group consisting of benzene, toluene and xylene. The hydrocarbon-containing gas may contain at least one from the group consisting of carbon monoxide, carbon dioxide, hydrogen, oxygen, nitrogen, nitrogen oxides, sulfur oxides and water. Specific examples of the hydrocarbon-containing gas include combustion gases, such as exhaust gases from internal combustion engines.

Preferably, a contact temperature for the step is room temperature to 200° C.

EXAMPLES

The hydrocarbon adsorbent of the present disclosure will be described in more detail below with reference to examples. The present disclosure is not limited to the examples.

(Determination of Crystal Structure)

An XRD measurement was performed on a sample with a typical X-ray diffractometer (instrument name: Ultima IV Protectus, manufactured by Rigaku Corporation). The radiation source used was CuKα radiation ($\lambda$=1.5405 Å), and the measurement was performed over a 2θ measurement range of 3° to 43°. The obtained XRD pattern was compared against a reference pattern to determine the crystal structure. Specific measurement conditions are shown below.

Acceleration current and voltage: 40 mA and 40 kV

Radiation source: CuKα radiation ($\lambda$=1.5405 Å)

Measurement mode: continuous scanning (2θ/θ scanning)

Scanning condition: 40°/minute

Measurement range: 2θ=3° to 43°

Vertical divergence limiting slit: 10 mm

Divergence/entrance slit: 1°

Receiving slit: open

Receiving solar slit: 5°

Detector: D/teX Ultra

Ni filter used (Composition Analysis)

A sample solution for a measurement was prepared by dissolving the sample into a mixed aqueous solution of hydrofluoric acid and nitric acid, and the sample solution was measured by inductively coupled plasma emission spectroscopy (ICP-AES) with a typical ICP instrument (instrument name: Optima 5300 DV, manufactured by PerkinElmer, Inc.). From the obtained measured values of Si, Al and the alkali metal (e.g., Cs and Na), the composition was determined regarding the $SiO_2/Al_2O_3$ ratio of the sample, the content (mass %) of the alkali metal and the like.

More specifically, the preparation of the sample solution for the measurement was performed as follows. Specifically, an aqueous mixed acid solution was obtained by mixing together 48% hydrofluoric acid, 60% nitric acid and water in a volume ratio of 1:1:50. Approximately 0.01 g of the sample was dissolved into 10 mL of the obtained aqueous mixed acid solution in a manner such that a concentration of each of the measurement target elements falls within a calibration curve concentration range. In this manner, the measurement solution was prepared. The calibration curve concentration and the measurement wavelength of each of the measurement target elements are shown in Table 1.

TABLE 1

| Measurement target element | Calibration curve concentration (ppm) | Measurement wavelength (nm) |
|---|---|---|
| Na | 10 | 589.6 |
| K | 10 | 766.5 |
| Cs | 50, 100 | 455.5 |
| Al | 10 | 396.2 |
| Si | 202.1 | 251.6 |

Example 1

(Synthesis of Large-Pore Zeolite (BEA-Type Zeolite))

A 35 mass % aqueous solution of TEAOH, a 48 mass % aqueous solution of potassium hydroxide, purified water and an amorphous aluminosilicate ($SiO_2/Al_2O_3$ ratio=18.2) were mixed together, and subsequently, 1.5 mass % of a zeolite β (product name: HSZ-930NHA, manufactured by Tosoh Corporation), which was used as a seed crystal, was added to the mixture to produce a raw material composition having the following molar composition.

$SiO_2/Al_2O_3$ ratio=18.2
$TEAOH/SiO_2$ ratio=0.12
$K/SiO_2$ ratio=0.12
$H_2O/SiO_2$ ratio=12.0
Seed crystal=1.5 mass %

The raw material composition was loaded into a sealed container, and the container was rotated at 55 rpm to allow the raw material composition to undergo a reaction at 150° C. for 48 hours to yield a crystallized product. The resulting crystallized product was subjected to solid-liquid separation and washing with purified water. Subsequently, the resultant was dried in air at 110° C. for 24 hours and then collected. The resulting crystallized product was calcined in air at 600° C. for 2 hours to form a calcined product. The calcined product was mixed with a 20% aqueous solution of ammonium chloride, which was used in an amount such that a large excess of $NH_4$, namely, in an amount of 30 molar equivalents relative to the amount of Al of the calcined product, was present. The mixed aqueous solution was subjected to a stirring and mixing process in which an operation of stirring the mixed aqueous solution at 80° C. for 24 hours and subsequently filtering the mixed solution was performed twice. Subsequently, the resultant was dried in air at 110° C. overnight. In this manner, a large-pore zeolite (BEA-type zeolite) in which $SiO_2/Al_2O_3$ was 18, and the type of the cation was $NH_4$ was obtained. The concentrations of Na and K in the obtained BEA-type zeolite were less than or equal to the detection limits.

(Impregnation of Alkali Metal (Cs))

A 2 mass % aqueous solution of cesium chloride was prepared with cesium chloride (manufactured by Fujifilm Wako Pure Chemical Corporation (special grade)). For the incorporation (impregnation) of the alkali metal, the aqueous solution of cesium chloride was used in an amount such that the alkali metal (Cs) was present in an amount of 4 molar equivalents relative to the amount of Al of the obtained BEA zeolite (large-pore zeolite).

The obtained BEA-type zeolite was mixed with water, and subsequently, the mixture was filtered for solid-liquid separation to produce a cake of the obtained zeolite. The aqueous solution of cesium chloride was passed through the cake, and subsequently, hot water (60° C.) in a mass amount 10 times that of the zeolite (cake) was passed through the cake to wash the cake. After the washing, the cake was dried at 110° C. in air for 24 hours to carry out the impregnation of the alkali metal (Cs). Accordingly, a Cs-containing BEA-type zeolite was obtained and designated as a hydrocarbon adsorbent of the present Example. ICP analysis was performed on the obtained hydrocarbon adsorbent to determine the content (mass %) of the alkali metal (Cs, in the present Example) and the Cs/Al molar ratio (before treatment) of the hydrocarbon adsorbent.

(Quantitative Determination of Amount of Alkali Metal in State of Being Ion-Exchangeable)

The amount of the alkali metal that was in a state of being ion-exchangeable was determined as follows.

The Cs-containing BEA-type zeolite (hydrocarbon adsorbent of the present Example) was additionally impregnated with Na. A 2 mass % aqueous solution of sodium chloride was prepared with sodium chloride (manufactured by Manac Incorporated). The aqueous solution of sodium chloride was used for impregnation, that is, ion exchange of Cs with Na. The amount of use of the solution was such that the alkali metal (Na) was present in an amount of 5 molar equivalents relative to the amount of Al of the hydrocarbon adsorbent (zeolite) obtained by impregnation with Cs as described above.

The obtained Cs-containing BEA-type zeolite was mixed with water, and subsequently, the mixture was filtered through a funnel to produce a cake of the obtained zeolite. The aqueous solution of sodium chloride was passed through the cake, and subsequently, hot water (60° C.) in a mass amount 10 times that of the obtained zeolite was passed through the cake to carry out washing. After the washing, the cake was dried at 110° C. in air, and, accordingly, a Na-additionally impregnated product was obtained. ICP analysis was performed on the obtained additionally impregnated product to determine a Cs/Al molar ratio (after treatment). The amount (%) of ion-exchangeable cesium, that is, cesium that was in a state of being ion-exchangeable, in the total amount of cesium in the hydrocarbon adsorbent was calculated according to the following equation.

[Chem. 1]

$$\text{Amount (\%) of ion-exchangeable alkali metal} =$$

-continued $$\frac{\begin{array}{c}Cs/Al\ \text{molar ratio (before treatment)} - \\ Cs/Al\ \text{molar ratio (after treatment)}\end{array}}{Cs/Al\ \text{molar ratio (before treatment)}} \times 100$$

Furthermore, the content (mass %) of the alkali metal that was in a state of being ion-exchangeable included in the BEA-type zeolite, which was included in the hydrocarbon adsorbent of the present Example, was calculated by multiplying the content (mass %) of the alkali metal determined as described above by the content (%) of the alkali metal that was in a state of being ion-exchangeable. The results are shown in Table 2.

Example 2

A hydrocarbon adsorbent of the present Example was obtained as in Example 1, except that an FAU-type zeolite (product name: HSZ-320NAA, manufactured by Tosoh Corporation, $SiO_2/Al_2O_3=6$) was used instead of a BEA-type zeolite. The content (mass %) of the alkali metal (Cs, in the present Example) and the amount of ion-exchangeable cesium were quantitatively determined.

Example 3

A hydrocarbon adsorbent of the present Example was obtained as in Example 1, except that an FAU-type zeolite (product name: HSZ-341NHA, manufactured by Tosoh Corporation, $SiO_2/Al_2O_3=7$) was used instead of a BEA-type zeolite. The content (mass %) of the alkali metal (Cs, in the present Example) was and the amount of ion-exchangeable cesium were quantitatively determined.

Example 4

A hydrocarbon adsorbent of the present Example was obtained as in Example 1, except that an MOR-type zeolite (product name: HSZ-610HOA, manufactured by Tosoh Corporation, $SiO_2/Al_2O_3=11$) was used instead of a BEA-type zeolite. The content (mass %) of the alkali metal (Cs, in the present Example) and the amount of ion-exchangeable cesium were quantitatively determined.

Example 5

A hydrocarbon adsorbent of the present Example was obtained as in Example 1, except that an MFI-type zeolite (product name: HSZ-820NHA, manufactured by Tosoh Corporation, $SiO_2/Al_2O_3=23$) was used instead of a BEA-type zeolite. The content (mass %) of the alkali metal (Cs, in the present Example) and the amount of ion-exchangeable cesium were quantitatively determined.

Example 6

A hydrocarbon adsorbent of the present Example was obtained as in Example 1, except that a BEA-type zeolite (product name: HSZ-931HOA, manufactured by Tosoh Corporation, $SiO_2/Al_2O_3=28$) was used instead of the BEA-type zeolite used in Example 1. The content (mass %) of the alkali metal (Cs, in the present Example) and the amount of ion-exchangeable cesium were quantitatively determined.

Example 7

A hydrocarbon adsorbent of the present Example was obtained as in Example 1, except that an MFI-type zeolite (product name: HSZ-830NHA, manufactured by Tosoh Corporation, $SiO_2/Al_2O_3=28$) was used instead of a BEA-type zeolite. The content (mass %) of the alkali metal (Cs, in the present Example) and the amount of ion-exchangeable cesium were quantitatively determined.

Example 8

A hydrocarbon adsorbent of the present Example was obtained with a method similar to that of Example 5, except that the impregnation of an alkali metal was performed with the following method. Specifically, a 5 mass % aqueous solution of cesium chloride was used in an amount such that Cs was present in an amount of 2 molar equivalents relative to the amount of Al of the zeolite. The aqueous solution of cesium chloride and the zeolite were mixed together, and an operation of stirring the mixed aqueous solution at 80° C. for 24 hours and subsequently filtering the mixed solution was performed twice. Water (60° C.) in a mass amount 10 times that of the obtained zeolite was passed through the zeolite, and the resultant was washed. After the washing, the resultant was dried at 110° C. in air to carry out the impregnation of the alkali metal (Cs).

Example 9

A hydrocarbon adsorbent of the present Example was obtained as in Example 8, except that an MFI-type zeolite (product name: HSZ-840NHA, manufactured by Tosoh Corporation, $SiO_2/Al_2O_3=39$) was used instead of the MFI-type zeolite used in Example 8.

Example 10

A hydrocarbon adsorbent of the present Example was obtained as in Example 1, except that an MFI-type zeolite (product name: HSZ-840NHA, manufactured by Tosoh Corporation, $SiO_2/Al_2O_3=39$) was used instead of a BEA-type zeolite.

Example 11

A hydrocarbon adsorbent of the present Example was obtained as in Example 10, except that a 10 mass % aqueous solution of sodium chloride (manufactured by Fujifilm Wako Pure Chemical Corporation) was used instead of an aqueous solution of cesium chloride, and the process of impregnation of an alkali metal (impregnation of Na) was performed with the solution in an amount such that Na was present in an amount of 50 molar equivalents relative to the amount of Al of the zeolite.

Example 12

A hydrocarbon adsorbent of the present Example was obtained as in Example 10, except that a 2 mass % aqueous solution of potassium chloride (manufactured by Kanto Chemical Co., Inc.) was used instead of an aqueous solution of cesium chloride, and the process of impregnation of an alkali metal (impregnation of K) was performed with the solution in an amount such that K was present in an amount of 10 molar equivalents relative to the amount of Al of the zeolite.

Example 13

A hydrocarbon adsorbent of the present Example was obtained as in Example 10, except that a 2 mass % aqueous solution of rubidium chloride (manufactured by Kanto Chemical Co., Inc.) was used instead of an aqueous solution of cesium chloride, and the process of impregnation of an alkali metal (impregnation of Rb) was performed with the solution in an amount such that Rb was present in an amount of 2 molar equivalents relative to the amount of Al of the zeolite.

Comparative Example 1

A hydrocarbon adsorbent of the present Comparative Example was obtained as in Example 1, except that an MFI-type zeolite (product name: HSZ-840NHA, manufactured by Tosoh Corporation, $SiO_2/Al_2O_3$=39) was used instead of a BEA-type zeolite, and the impregnation of an alkali metal was not performed.

Measurement Example 1

(Preparation and Pretreatment of Measurement Sample)

The hydrocarbon desorption start temperature of the hydrocarbon adsorbents obtained in the Examples and the Comparative Example was measured. Each of the hydrocarbon adsorbents of the Examples and the Comparative Example was pressure-molded and ground to form an irregular-shaped molded body having an aggregate size of 20 to 30 mesh. The resulting molded bodies were designated as respective measurement samples of the Examples and the Comparative Example. A pretreatment was performed as follows. 1 g of each of the measurement samples was loaded into a normal-pressure fixed bed flow reactor and treated at 500° C. for 1 hour under a nitrogen flow, and subsequently, the measurement sample was cooled to 50° C.

(Adsorption of Hydrocarbons)

A hydrocarbon-containing gas was flowed through each of the hydrocarbon adsorbents treated by the pretreatment, and adsorbed hydrocarbons were measured over a range of 50° C. to 600° C., to determine an amount of adsorbed hydrocarbons. A composition of the hydrocarbon-containing gas and the measurement conditions are shown below.

Hydrocarbon-containing gas:
toluene 3000 volume ppmC (equivalent methane concentration)
Water 3 vol %
Nitrogen balance
Gas flow rate: 200 mL/minute
Measurement temperature: 50 to 600° C.
Heating rate: 10° C./minute (Measurement of Hydrocarbon Desorption Start Temperature)

Hydrocarbons in the gas after the gas passed through the hydrocarbon adsorbent were quantitatively analyzed continuously with a flame ionization detector (FID). The following hydrocarbon concentrations were measured: a hydrocarbon concentration of the hydrocarbon-containing gas on an inlet side of a normal-pressure fixed bed flow reactor (an equivalent methane concentration, hereinafter referred to as an "inlet concentration"); and a hydrocarbon concentration of the hydrocarbon-containing gas on an outlet side of the normal-pressure fixed bed flow reactor (an equivalent methane concentration, hereinafter referred to as an "outlet concentration").

An integral value of the inlet concentrations was designated as an amount of hydrocarbons that passed through the hydrocarbon adsorbent. By determining a value resulting from the subtraction of an integral value of the outlet concentrations (equivalent methane concentrations) from the amount of hydrocarbons, the amount of adsorbed hydrocarbons in each of the adsorbents was determined as an amount of desorbed hydrocarbons per mass of the hydrocarbon adsorbent (μmolC/g). In association with the increase in the temperature of the measurement sample, the temperature at which the amount of desorbed hydrocarbons reached 0 μmolC/g in the shortest time was designated as the desorption start temperature.

The hydrocarbon desorption start temperatures of Measurement Example 1 are shown in the table below. Furthermore, a relationship between the $SiO_2/Al_2O_3$ ratio and the desorption start temperature is shown in FIG. 1.

TABLE 2

| | Zeolite structure | Type of Me | Total content of Me (wt %) | Proportion of ion-exchangeable Me (mol %) | Content of ion-exchangeable Me (wt %) | $SiO_2/Al_2O_3$ (ratio) | Desorption start temperature (° C.) |
|---|---|---|---|---|---|---|---|
| Example 1 | BEA | Cs | 14.1 | 73.2 | 10.3 | 18 | 183 |
| Example 2 | FAU | Cs | 29.2 | 94.4 | 27.6 | 6 | 214 |
| Example 3 | FAU | Cs | 13.0 | 81.7 | 10.6 | 7 | 192 |
| Example 4 | MOR | Cs | 26.8 | 24.5 | 6.6 | 11 | 195 |
| Example 5 | MFI | Cs | 16.7 | 63.6 | 10.6 | 23 | 175 |
| Example 6 | BEA | Cs | 9.6 | 44.2 | 4.2 | 28 | 176 |
| Example 7 | MFI | Cs | 14.3 | 51.5 | 7.4 | 28 | 169 |
| Example 8 | MFI | Cs | 15.6 | 63.4 | 9.9 | 23 | 174 |
| Example 9 | MFI | Cs | 8.7 | 58.3 | 5.1 | 39 | 165 |
| Example 10 | MFI | Cs | 10.1 | 65.7 | 6.6 | 39 | 165 |
| Example 11 | MFI | Na | 1.5 | — | — | 39 | 163 |
| Example 12 | MFI | K | 2.6 | — | — | 39 | 174 |
| Example 13 | MFI | Rb | — | — | — | 39 | 174 |
| Comparative Example 1 | MFI | — | 0.0 | — | — | 39 | 128 |

In Table 2, "Me" represents an alkali metal, "Total content of Me" represents a total amount of the alkali metal included in the hydrocarbon adsorbent, "Proportion of ion-exchangeable Me" represents a proportion of the alkali metal that was in a state of being ion-exchangeable in the alkali metal present in the zeolite and "Content of ion-exchangeable Me" represents a content (mass %) of the alkali metal that was included in the zeolite and was in a state of being ion-exchangeable.

As shown in Table 2, the hydrocarbon adsorbents of the Examples had hydrocarbon desorption start temperatures higher than that of the hydrocarbon adsorbent of Comparative Example 1 and retained hydrocarbons until a higher temperature was reached. In each of the Examples, there was a tendency for the hydrocarbon desorption start temperature to increase as the content of the alkali metal that was in a state of being ion-exchangeable increased.

Furthermore, the hydrocarbon adsorbents of Examples 11 to 13, which contained Na, K or Rb as the alkali metal, also had higher hydrocarbon desorption start temperatures than the hydrocarbon adsorbent of Comparative Example 1, as with the hydrocarbon adsorbents of Examples 1 to 10.

Furthermore, referring to FIG. 1, the hydrocarbon desorption start temperature had a linear relationship with the $SiO_2/Al_2O_3$ ratio, and there was a tendency for the hydrocarbon desorption start temperature to increase as the $SiO_2/Al_2O_3$ ratio decreased, independently of the structure of the zeolite.

The entire contents of the specification, claims, drawing and abstract of Japanese Patent Application No. 2020-

064909, filed on Mar. 31, 2020, is incorporated herein by reference as a disclosure of the specification of the present disclosure.

The invention claimed is:

1. A hydrocarbon adsorbent comprising:
an alkali metal; and
  a zeolite having a ring structure that includes at least 10 members selected from at least one of a BEA zeolite, an FAU zeolite, or an MOR zeolite, wherein
  a content of the alkali metal is 1 to 40 mass % based on a total mass of the hydrocarbon adsorbent,
  a content of the zeolite having a ring structure that includes at least 10 members is 99 to 60 mass % based on the total mass of the hydrocarbon adsorbent,
  at least a portion of the alkali metal is in a state of being ion-exchangeable,
  wherein a content of the alkali metal that is in a state of being ion-exchangeable is 1 mass % or more and 40 mass % or less based on the total mass of the hydrocarbon adsorbent,
  the zeolite has a molar ratio of silica to alumina ($SiO_2/Al_2O_3$ ratio) of 5 or more and 20 or less, and the hydrocarbon adsorbent exhibits a desorption start temperature of from 180° C. to less than 200° C.

2. The hydrocarbon adsorbent according to claim 1, wherein the content of the alkali metal that is in a state of being ion-exchangeable is 4 mass % or more and 40 mass % or less based on the total mass of the hydrocarbon adsorbent.

3. The hydrocarbon adsorbent according to claim 1, wherein the alkali metal is at least one selected from the group consisting of potassium, sodium, rubidium and cesium.

4. The hydrocarbon adsorbent according to claim 3, wherein the alkali metal is rubidium and/or cesium.

5. The hydrocarbon adsorbent according to claim 1, wherein the zeolite having a ring structure that includes at least 10 members is a zeolite having at least one structure selected from a group of a BEA structure, an MFI structure, an MOR structure and an FAU structure.

6. A method for adsorbing a hydrocarbon, the method comprising using the hydrocarbon adsorbent according to claim 1.

* * * * *